(12) United States Patent
Branton et al.

(10) Patent No.: US 8,656,903 B1
(45) Date of Patent: Feb. 25, 2014

(54) FLIP TOP GRILL ASSEMBLY

(76) Inventors: Christopher A. Branton, Bossier City, LA (US); Dirk de Bod, Windhoek (NA)

( * ) Notice: Subject to any disclaimer, the term of this patent is extended or adjusted under 35 U.S.C. 154(b) by 1176 days.

(21) Appl. No.: 12/587,475

(22) Filed: Oct. 7, 2009

(51) Int. Cl.
*F24B 3/00* (2006.01)
*A47J 37/00* (2006.01)

(52) U.S. Cl.
USPC ............ 126/25 R; 126/41 B; 99/395; 99/397; 99/398

(58) Field of Classification Search
USPC ........ 126/30, 29, 59, 64, 181, 9 R, 9 B, 39 L, 126/14, 41 B, 25 R, 39 B, 1 R, 25 A, 23, 38, 126/506; 99/395, 397, 398, 426, 450
See application file for complete search history.

(56) References Cited

U.S. PATENT DOCUMENTS

| 2,826,981 | A | 3/1958 | Chick | |
|---|---|---|---|---|
| 3,025,782 | A | 3/1962 | Stall | |
| 3,559,565 | A | 2/1971 | Getz | 99/340 |
| 4,479,422 | A | 10/1984 | Wagstaff | 99/395 |
| 4,492,152 | A | 1/1985 | DeSantis | 99/397 |
| 4,944,282 | A | 7/1990 | Aguiar et al. | 126/25 |
| 5,782,224 | A | 7/1998 | Rabell | 126/25 R |
| 5,884,554 | A | 3/1999 | Sprick | 99/340 |
| 2004/0031478 | A1 | 2/2004 | Gifford | 126/25 |

*Primary Examiner* — John K Fristoe, Jr.
*Assistant Examiner* — Kevin Barss
(74) *Attorney, Agent, or Firm* — R. Keith Harrison

(57) ABSTRACT

A flip top grill assembly includes an assembly base, a pair of linkage assemblies carried by the assembly base, a grill cage carried by the pair of linkage assemblies and positional between a first position and a second position inverted with respect to the first position and at least one handle operably engaging at least one of the pair of linkage assemblies and adapted to facilitate pivoting of the grill cage between the first position and the second position responsive to manipulation of the handle.

20 Claims, 4 Drawing Sheets

FLIP TOP GRILL ASSEMBLY

FIELD

The present disclosure generally relates to cooking grills. More particularly, the present disclosure relates to a flip top grill assembly having a grill cage in which foods can be placed for grilling over a heat source and which can be inverted to grill both sides of the foods without exposure of a user to heat from the heat source.

BACKGROUND

Food such as meats and vegetables is commonly cooked on an indoor or outdoor cooking grill to impart a robust flavor to the food. A conventional cooking grill may include a receptacle which contains a heat source such as burning charcoal or propane or other gas and a food support frame or mesh which may have multiple metal bars or a metal grid which is placed in the receptacle over the heat source. The food is placed on the food support frame and heat which radiates from the heat source cooks the side of the food which rests on the food support frame. Periodically, the food may be flipped or turned on the food support frame using a spatula or like implement to uniformly cook both sides of the food.

One of the drawbacks of conventional cooking grills is that during flipping or turning of the food, the food may inadvertently be dropped between the bars of the food support frame and onto the heat source. Additionally, the person who flips the food using the spatula or other implement may be required to reach over the grill to flip the food, exposing the person's hand and arm to heat from the heat source. Therefore, a flip top grill assembly having a grill cage in which foods can be placed for grilling and which can be inverted to grill both sides of the foods without exposure of a user to heat from a heat source is needed.

SUMMARY

The present disclosure is generally directed to a flip top grill assembly. An illustrative embodiment of the flip top grill assembly includes an assembly base, a pair of linkage assemblies carried by the assembly base, a grill cage carried by the pair of linkage assemblies and positional between a first position and a second position inverted with respect to the first position and at least one handle operably engaging at least one of the pair of linkage assemblies and adapted to facilitate pivoting of the grill cage between the first position and the second position responsive to manipulation of the handle.

BRIEF DESCRIPTION OF THE DRAWINGS

The disclosure will now be made, by way of example, with reference to the accompanying drawings, in which.

DETAILED DESCRIPTION

Figure 1A:
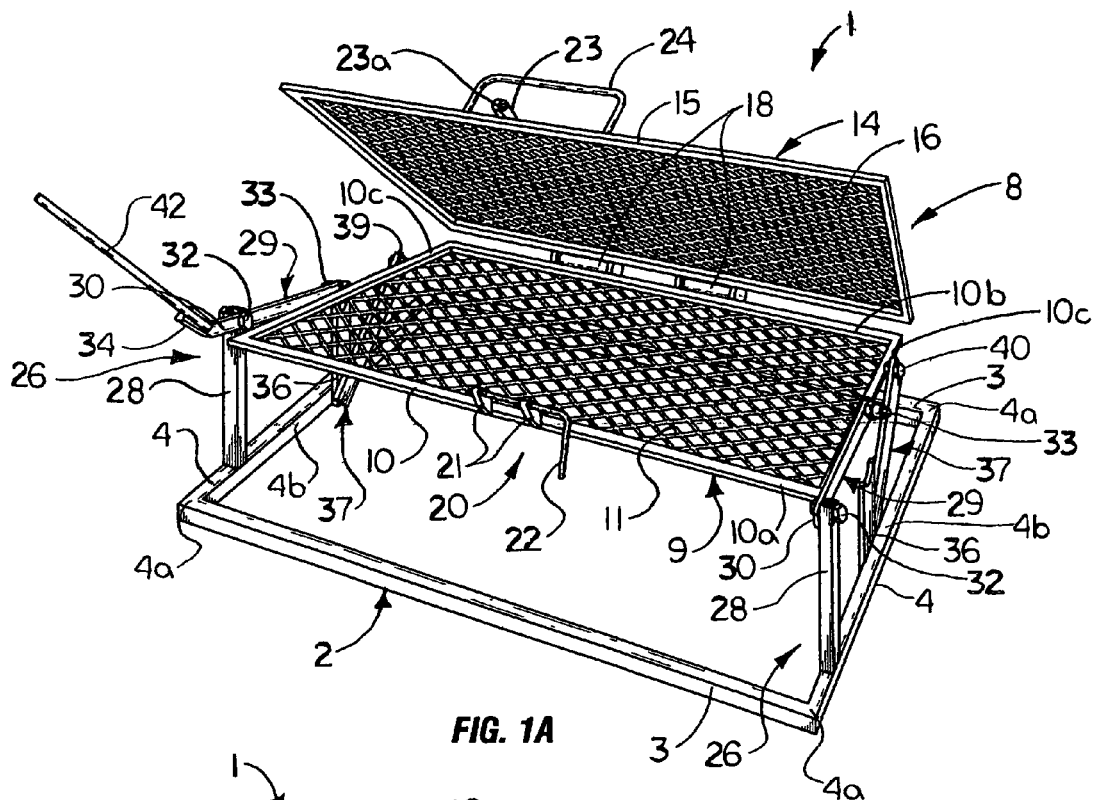
FIG. 1A is a front perspective view of an illustrative embodiment of the flip top grill assembly, with a cover grill panel pivoted away from a base grill panel of a grill cage preparatory to placement of food (not illustrated) between or removal of the food from between the base grill panel and the cover grill panel.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description. As used herein, relative terms such as "horizontal", "vertical", "top", "bottom", "upper", "lower", "upwardly", "downwardly", "front", "rear" and "side" are used for descriptive purposes only and not in a limiting sense.

Referring to the drawings, an illustrative embodiment of the flip top grill assembly is generally indicated by reference numeral 1. As will be hereinafter further described, the flip top grill assembly 1 may include an assembly base 2. A grill cage 8 may be provided on the assembly base 2. Linkage assemblies 26 may attach the grill cage 8 to the assembly base 2. At least one handle 42 may operably engage at least one of the linkage assemblies 26 in such a manner that the grill cage 8 can be selectively rotated between a horizontal load/unload position illustrated in FIG. 1B and a horizontal inverted position illustrated in FIGS. 3 and 4 responsive to actuation of the handle 42. The grill cage 8 is adapted to contain food (not illustrated) such as meats and vegetables, for example and without limitation, which are to be grilled by heat radiating from a heat source such as charcoal 56 (FIG. 7) positioned typically beneath the grill cage 8. Accordingly, the heat from the heat source cooks both sides of the food as the grill cage 8 is alternately disposed in the horizontal load/unload position and the horizontal inverted position, respectively.

The assembly base 2, the linkage assemblies 26, the grill cage 8 and other components of the flip top grill assembly 1 may be steel, iron or other heat-resistant material. In some embodiments, the grill base 2 of the flip top grill assembly 1 may have a generally elongated, rectangular shape, with a pair of generally elongated, parallel, spaced-apart longitudinal base members 3 and a pair of generally elongated, parallel, spaced-apart transverse base members 4 which connect the longitudinal base members 3. Each transverse base member 4 may have a pair of base member ends 4a which meet the corresponding ends of the respective longitudinal base members 3 and a base member middle 4b which is substantially equidistant between the base member ends 4a. In other embodiments, the grill base 2 may have alternative shapes or configurations which are consistent with the support requirements of the grill base 2.

The grill cage 8 may be attached to the grill base 2 in a manner which will be hereinafter described. The grill cage 8 may have any design which is suitable for containing food (not illustrated) during grilling of the food and which is capable of facilitating radiation of heat from a heat source such as charcoal 56 (FIG. 7), for example and without limitation, provided typically beneath the grill cage 8 to the food contained in the grill cage 8, as will be hereinafter further described. As illustrated in FIG. 1A, in some embodiments, the grill cage 8 may include a base grill panel 9 and a cover grill panel 14 which can be selectively opened and closed with respect to the base grill panel 9 according to any suitable technique which is known by those skilled in the art. In some embodiments, the cover grill panel 14 may be pivotally attached to the base grill panel 9 via at least one panel hinge 18, as illustrated. In other embodiments, the entire cover grill panel 14 may be detachably removable with respect to the base grill panel 9 according any suitable technique known by those skilled in the art.

In some embodiments, each of the base grill panel 9 and the cover grill panel 14 of the grill cage 8 may have a generally elongated, rectangular shape, as illustrated in FIG. 1A. Accordingly, the base grill panel 9 may include a generally elongated, rectangular base grill panel frame 10 having a generally elongated front frame member 10a; a generally elongated rear frame member 10b disposed in generally parallel, spaced-apart relationship with respect to the front frame member 10a; and a pair of generally elongated, parallel, spaced-apart side frame members 10c which connect the front frame member 10a and the rear frame member 10b to each other. A base grill panel mesh 11 may be welded, fastened and/or otherwise attached to a lower surface of the base grill panel frame 10 of the base grill panel 9 relative to the generally horizontal load/unload position of the grill cage 8 illustrated in FIGS. 1A and 1B. The cover grill panel 14 may include a generally elongated, rectangular cover grill panel frame 15 which may be generally similar in size and shape to the base grill panel frame 10 of the base grill panel 9. A cover grill panel mesh 16 may be welded, fastened and/or otherwise attached to an upper surface of the cover grill panel frame 15 relative to the generally horizontal load/unload position of the grill cage 8 illustrated in FIG. 1B. In other embodiments, the base grill panel 9 and the cover grill panel 14 of the grill cage 8 may have alternative shapes or configurations which are consistent with the functional requirements of the grill cage 8.

Figure 1B:
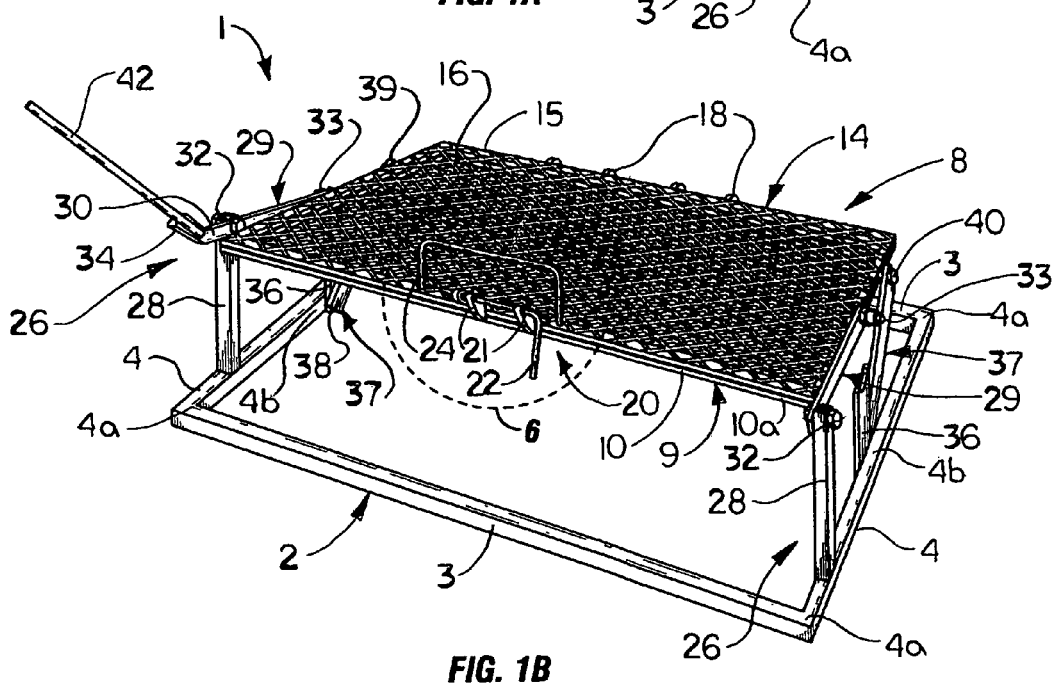
FIG. 1B is a front perspective view of an illustrative embodiment of the flip top grill assembly, with the grill cage oriented in a horizontal load/unload position and the cover grill panel pivoted to rest on and latched to the base grill panel of the grill cage in the securing of food (not illustrated) between the base grill panel and the cover grill panel preparatory to grilling the food.
Figure 6:
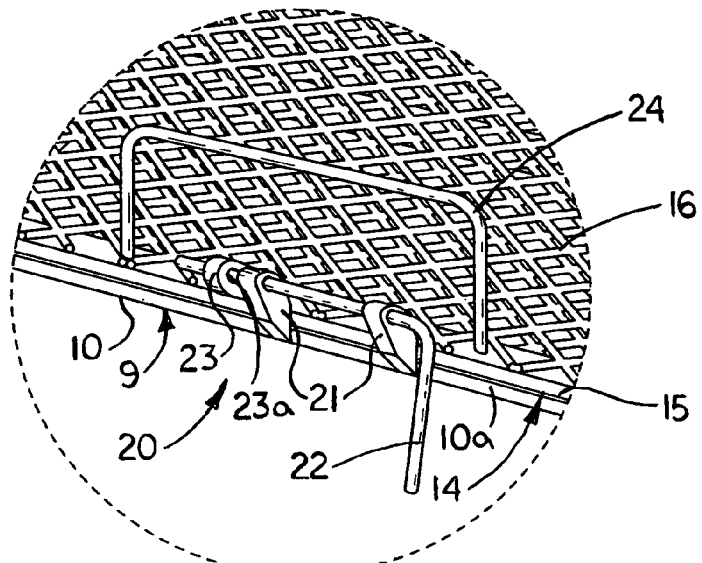
FIG. 6 is an enlarged sectional view, taken along section line 6 in FIG. 1B, of an exemplary grill cage latch which is suitable for securing the cover grill panel to the base grill panel of the grill cage of an illustrative embodiment of the flip top grill assembly.

A grill cage latch 20 may be provided on the grill cage 8 to facilitate selective latching of the cover grill panel 14 to the base grill panel 9 in the closed position of the grill cage 8 which is illustrated in FIG. 1B. The grill cage latch 20 may have any design which is known by those skilled in the art and suitable for the purpose. As illustrated in FIG. 6, in some embodiments the grill cage latch 20 may include a pair of spaced-apart latch rod supports 21 provided on the front frame member 10a of the base grill panel frame 10. A generally elongated latch rod 22 may be slidably disposed in registering rod openings (not illustrated) provided in the respective latch rod supports 21. As illustrated in FIG. 1A, a latch receptacle 23 through which extends a transverse latch receptacle opening 23a may extend from the cover grill panel frame 15 of the cover grill panel 14. When the cover grill panel 14 is closed on the base grill panel 9, as illustrated in FIG. 1B, the latch rod 22 may be slidably extended through the latch receptacle opening 23a provided in the latch receptacle 23 to selectively lock the grill cage 8 in the closed position. Conversely, the latch rod 22 may be slidably removed from the latch receptacle opening 23a to selectively unlock the grill cage 8 and facilitate opening of the cover grill panel 14 with respect to the base grill panel 9. A handle 24 may be provided on the cover grill panel frame 15 or other location on the cover grill panel 14 to facilitate selective raising and lowering of the cover grill panel 14 with respect to the base grill panel 9.

Figure 3:
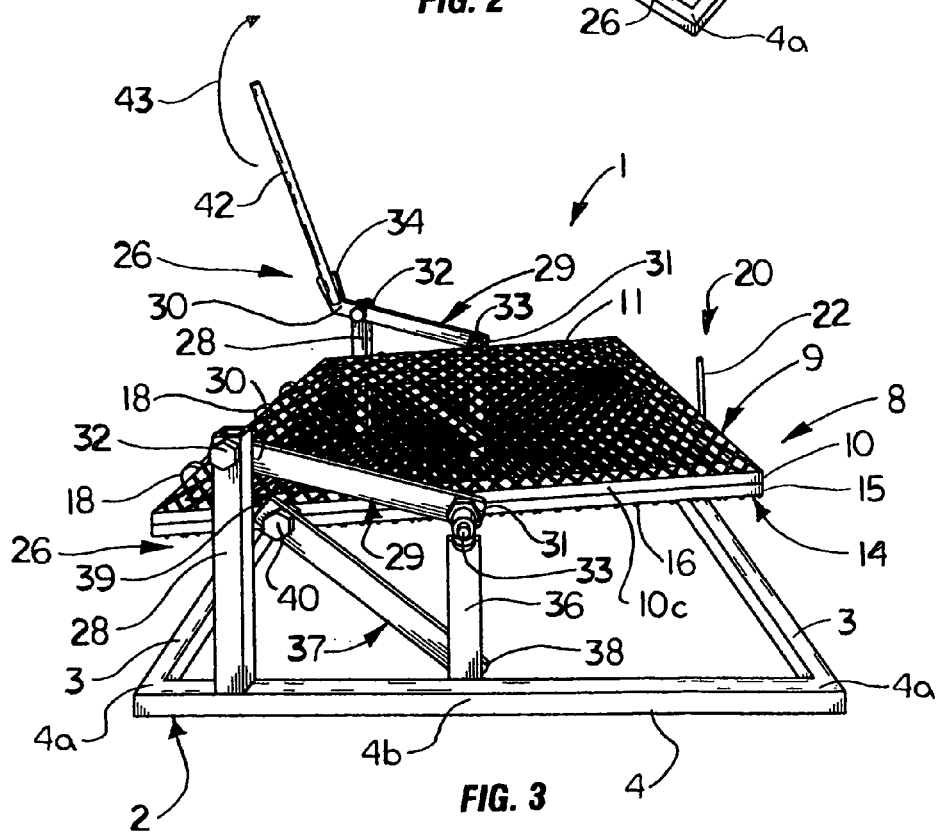
FIG. 3 is a left side view of an illustrative embodiment of the flip top grill assembly, with the horizontal grill cage disposed in an inverted position relative to the load/unload position which is illustrated in FIG. 1B.
Figure 4:
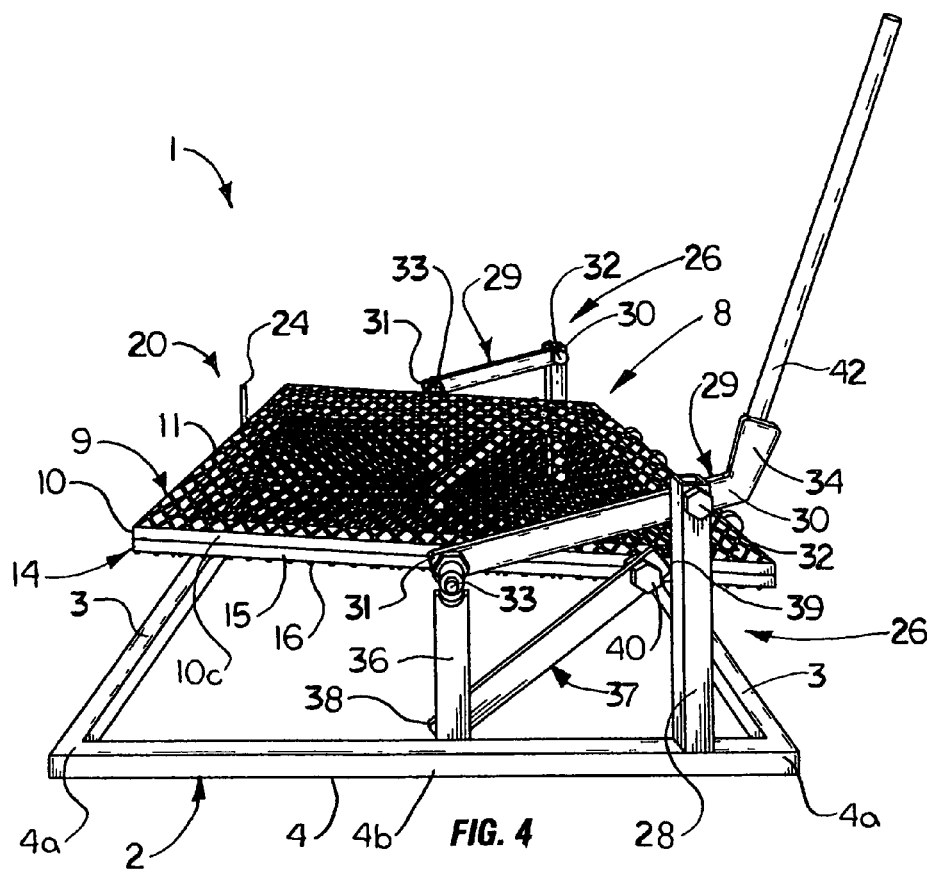
FIG. 4 is a right side view of an illustrative embodiment of the flip top grill assembly, with the grill cage disposed in the inverted horizontal position illustrated in FIG. 3.

The grill cage 8 may be attached to the grill base 2 in any suitable manner which facilitates selective rotation of the grill cage 8 between the horizontal load/unload position illustrated in FIG. 1B and the horizontal inverted position illustrated in FIGS. 3 and 4. In some embodiments, a pair of spaced-apart linkage assemblies 26 may be provided on the grill base 2 and the grill cage 8 may be supported by the linkage assemblies 26. As particularly illustrated in FIGS. 3 and 4, each linkage assembly 26 may include a generally elongated side cage support arm 28 which extends vertically from the corresponding transverse base member 4 of the grill base 2 generally between a base member end 4a and the base member middle 4b of the corresponding transverse base member 4. A generally elongated side cage support arm linkage 29 may have an arm attachment end 30 which is pivotally attached to the upper end of the side cage support arm 28 via a pivot bolt 32 and a cage attachment end 31 which is pivotally attached to the corresponding side frame member 10c of the base grill panel frame 10 of the base grill panel 9 of the grill cage 8 via a pivot shaft 33. The cage attachment end 31 of the side cage support arm linkage 29 may be attached to the side frame member 10c at generally the midpoint of the side frame member 10c.

A generally elongated shaft support arm 36 may extend vertically from the base member middle 4b of the corresponding transverse base member 4 of the grill base 2. A generally elongated shaft support arm linkage 37 may have an arm attachment end 38 which is pivotally attached to the lower end portion of the shaft support arm 36. A grill attachment end 39 of the shaft support arm linkage 37 may be pivotally attached to the corresponding side frame member 10c of the base grill panel frame 10 via a pivot bolt 40. The grill attachment end 39 of the shaft support arm linkage 37 may be attached to the side frame member 10c generally between the midpoint of the side frame member 10c and the front frame member 10a of the base grill panel frame 10.

At least one handle 42 may operably engage at least one of the linkage assemblies 26 in such a manner that movement of the handle 42 facilitates selective rotation or inversion of the grill cage 8 between the horizontal load/unload position illustrated in FIG. 1B and the horizontal inverted position illustrated in FIGS. 3 and 4. In some embodiments, a handle mount 34 may extend at a generally upward obtuse angle from the arm attachment end 30 of the side cage support arm linkage 29 of the linkage assembly 26. The handle 42 may extend from the handle mount 34 and may be fixedly attached or detachable with respect to the handle mount 34 according to the knowledge of those skilled in the art. Accordingly, when the grill cage 8 is disposed in the horizontal load/unload position illustrated in FIG. 1B, the handle 42 is oriented in an upwardly-extending position. The shaft support arm linkages 37 of the respective linkage assemblies 26 are angled to the rear of the shaft support arm 36 of each linkage assembly 26. Each pivot shaft 33 may rest on the shaft support arm 36 of the corresponding linkage assembly 26 when the grill cage 8 is disposed in the horizontal load/unload position illustrated in FIGS. 3 and 4.

Figure 2:
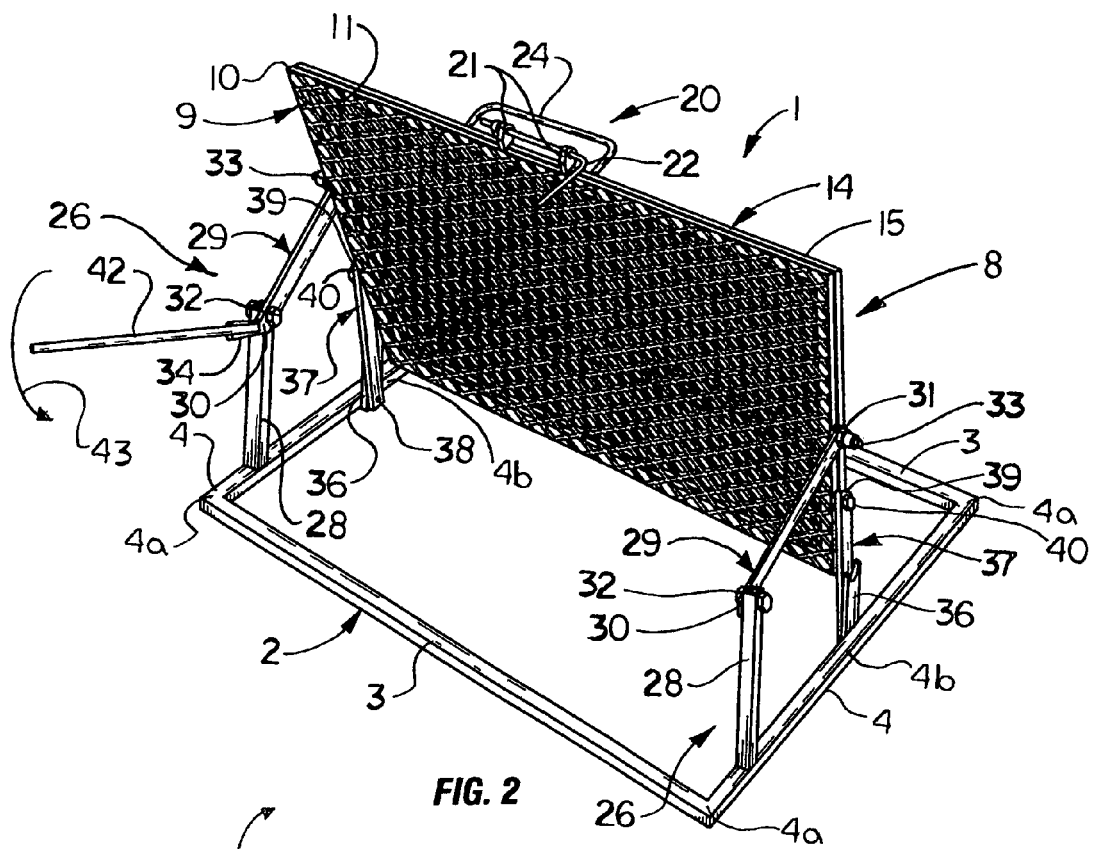
FIG. 2 is a front perspective view of an illustrative embodiment of the flip top grill assembly, with the grill cage pivoted from the horizontal load/unload position illustrated in FIG. 1B to a generally vertical position in transit to a horizontal inverted position.

As illustrated in FIG. 2, downward movement of the handle 42 through a vertical arc 43 (FIG. 2) facilitates upward pivoting of the side cage support arm linkage 29 of each linkage assembly 26 at the corresponding pivot bolt 32. Therefore, the side cage support arm linkage 29 to which the handle 42 is attached raises the front portion of the grill cage 8 while the shaft support arm linkages 37 of the respective linkage assemblies 26 simultaneously prevent upward movement of the rear portion of the grill cage 8. This combined effect of the side cage support arm linkage 29 and the shaft support arm linkages 37 causes the grill cage 8 to pivot with respect to the pivot shafts 33 until the grill cage 8 assumes the generally vertical position illustrated in FIG. 2. The handle 42 reaches the bottom position of the arc 43 as the grill cage 8 assumes the vertical position. During transit of the grill cage 8 from the horizontal load/unload position to the vertical position, the shaft support arm linkages 37 pivots from the rearwardly-angled position with respect to the respective shaft support arms 36, as illustrated in FIGS. 1A and 1B, to the vertical position illustrated in FIG. 2 in which vertical position the shaft support arm linkages 37 are generally parallel with respect to the respective shaft support arms 36.

Figure 5:
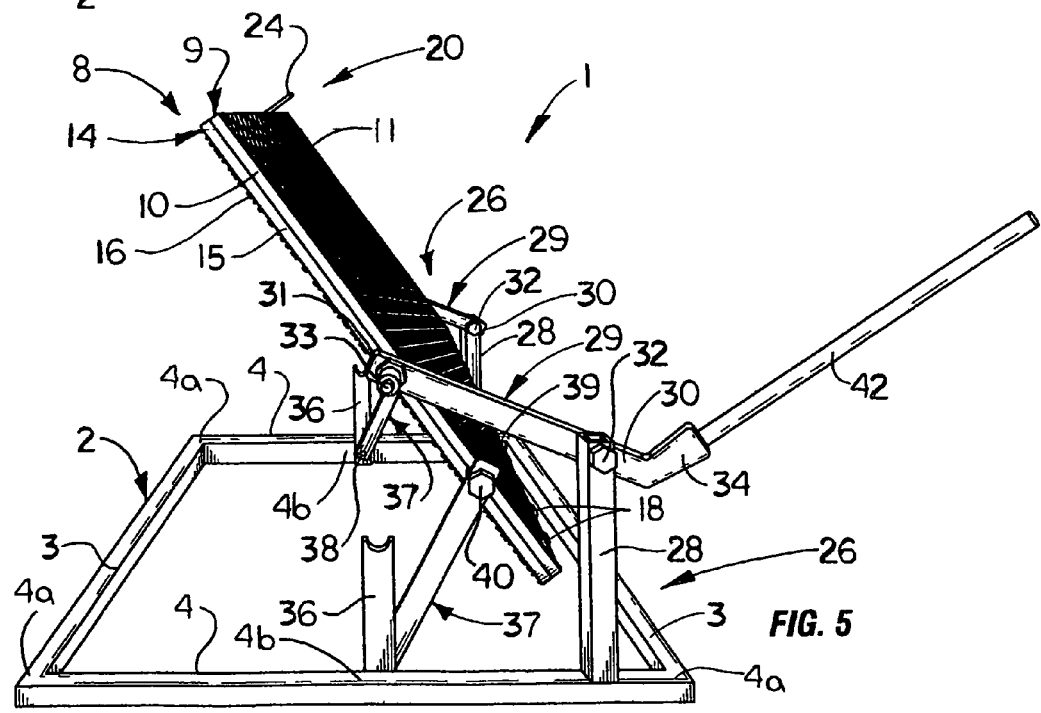
FIG. 5 is a right side view of an illustrative embodiment of the flip top grill assembly, with the grill cage approaching a vertical position in return of the grill cage from the horizontal inverted position illustrated in FIG. 4 back to the horizontal load/unload position illustrated in FIG. 1B.

Subsequent upward movement of the handle 42 along the arc 43, as illustrated in FIG. 3, completes inversion of the grill cage 8 as it facilitates pivoting of the grill cage 8 from the generally vertical position illustrated in FIG. 2 to the generally horizontal inverted position illustrated in FIGS. 3 and 4. This downward movement of the handle 42 pivots the side cage support arm linkage 29 to which the handle 42 is attached downwardly with respect to the side cage support arm 28 along the pivot bolt 32 as the shaft support arm linkage 37 pivots from the vertical position to the forwardly-angled position with respect to the shaft support arm 36. Simultaneously, the grill cage 8 rotates with respect to each side cage support arm linkage 29 along the pivot shaft 33 until the grill cage 8 reaches the horizontal inverted position. In the horizontal inverted position of the grill cage 8, each pivot shaft 33 may rest on the shaft support arm 36 of the corresponding linkage assembly 26. The grill cage 8 may be selectively returned to the horizontal load/unload position illustrated in FIG. 1B by first lowering the handle 42, as illustrated in FIG. 5, to pivot the grill cage 8 to the vertical position (FIG. 2) and then raising the handle 42 along the arc 43, reversing the motions of the side cage support arm linkage 29 and the shaft support arm linkage 37 of each linkage assembly 26 relative to that which occurs in rotation of the grill cage 8 from the load/unload position to the inverted position. The side cage support arm linkage 29 to which the handle 42 is not attached may passively pivot with respect to the pivot bolt 32 and the pivot shaft 33 during rotation of the grill cage 8.

Figure 7:
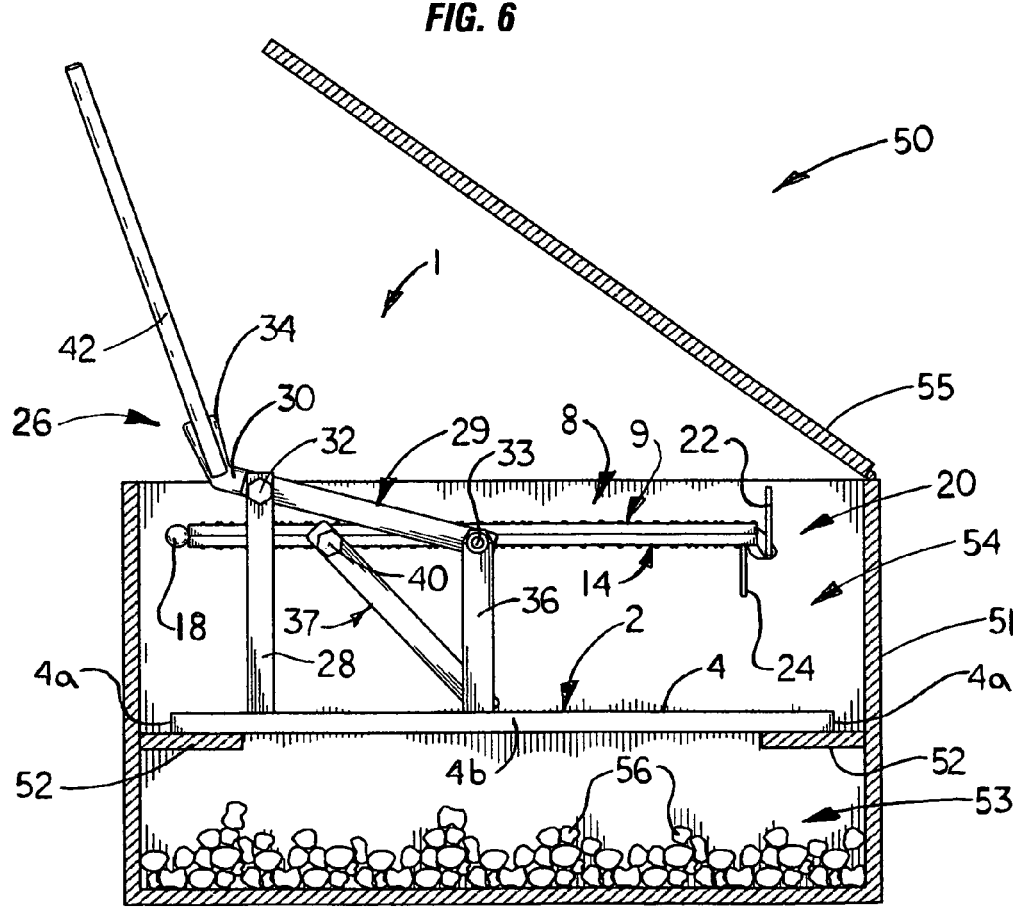
FIG. 7 is a cross-sectional view of a cooking grill, with an illustrative embodiment of the flip top grill assembly placed in the cooking grill in typical operation of the flip top grill assembly.

In use, food (not illustrated) may be placed in the grill cage 8 of the flip top grill assembly 1 to grill the food on both sides as heat radiates from a heat source (not illustrated) which may be provided beneath the grill cage 8. As illustrated in FIG. 7, in some applications the flip top grill assembly 1 may be used in conjunction with a cooking grill 50 which utilizes charcoal 56, burning propane (not illustrated) or the like as the heat source. In other applications, the flip top grill assembly 1 may be placed over an open fire (not illustrated) as the heat source. In some applications, the flip top grill assembly 1 can be used to smoke the food as the food is turned.

The cooking grill 50 may be conventional and may include a grill housing 51 having a lower interior portion 53 and an upper interior portion 54. A pivoting lid 55 may close the upper interior portion 54. A frame support 52 may be provided between the lower interior portion 53 and the upper interior portion 54. In the conventional cooking grill 50, the frame support 52 may normally be used to support a food support frame or mesh (not illustrated) in the cooking grill 50. In that case, the food support frame or mesh may be removed from the frame support 52 prior to placement of the flip top grill assembly 1 in the cooking grill 50. A heat source such as charcoal 56, for example and without limitation, may be provided in the lower interior portion 53 of the grill housing 51.

The assembly base 2 of the flip top grill assembly 1 may be placed on the grill support 52 in the upper interior portion 54 of the cooking grill 50, with the handle 42 extending from the upper interior portion 54. The grill cage 8 is initially positioned in the horizontal load/unload position illustrated in FIGS. 1A and 1B by manipulation of the handle 42 as was heretofore described. The grill cage 8 is then opened by removing the latch rod 22 from the latch receptacle opening 23a in the latch receptacle 23 of the grill cage latch 20 and pivoting the cover grill panel 14 upwardly along the panel hinges 18. Food (not illustrated) such as meats and/or vegetables, for example and without limitation, is then placed on the base grill panel mesh 11 of the base grill panel 9. The grill cage 8 is then closed by pivoting the cover grill panel 14 back onto the base grill panel 9 and extending the latch rod 22 back into the latch receptacle opening 23a of the latch receptacle 23.

After the charcoal 56 or other heat source in the lower interior portion 53 of the cooking grill 50 is ignited, heat radiates from the charcoal 56 into the upper interior portion 54 of the cooking grill 50 and cooks a first side of the food which faces downwardly toward the lower interior portion 53. After the first side of the food has been exposed to the heat for a selected period of time, the grill cage 8 may be rotated to the horizontal inverted position illustrated in FIGS. 3 and 4 by lowering and then raising the handle 42, as was heretofore described with respect to FIGS. 1B-4. Inversion of the grill cage 8 exposes the uncooked or unexposed second side of the food in the grill cage 8 to the heat from the charcoal 56 while the previously-exposed first side of the food faces upwardly in the cooking grill 50. After the second side of the food has been exposed to the heat from the charcoal 56, the grill cage 8 may again be rotated back to the load/unload position of FIG. 1B by manipulation of the handle 42 to again expose the first side of the food to the heat from the charcoal 56. Throughout grilling of the food, each side of the food can be exposed to the heat from the charcoal 56 any number of times as needed by manipulation of the handle 42. It will be appreciated by those skilled in the art that the handle 42 of the flip top grill assembly 1 remains outside the upper interior portion 54 of the cooking grill 50 throughout the full range of motion of the handle 42 as the grill cage 8 is rotated in the cooking grill 50. Therefore, the arm and hand (not illustrated) of the user remain unexposed to heat from the charcoal 56 or other heat source during grilling of the food contained in the grill cage 8.

After grilling of the food is completed, the grill cage 8 is returned to the horizontal load/unload position of FIG. 1B. The grill cage 8 is opened by manipulation of the grill cage latch 20 and pivoting of the cover grill panel 14 open on the base grill panel 9, after which the grilled food is removed from the base grill panel 9. The flip top grill assembly 1 may be removed from the upper interior portion 54 of the cooking grill 50 for cleaning of the flip grill assembly 1 and/or the cooking grill 50.

While the preferred embodiments of the disclosure have been described above, it will be recognized and understood that various modifications can be made in the disclosure and the appended claims are intended to cover all such modifications which may fall within the spirit and scope of the disclosure.

What is claimed is:

1. A flip top grill assembly, comprising:
    an assembly base;
    a pair of linkage assemblies carried by said assembly base;
    a grill cage carried by said pair of linkage assemblies and positional between a first position and a second position inverted with respect to said first position by actuation of at least one of said pair of linkage assemblies;
    a side cage support arm carried by said assembly base in fixed and immovable relationship thereto; and
    at least one handle pivotally carried by said side cage support arm and operably engaging said at least one of said pair of linkage assemblies and adapted to facilitate pivoting of said grill cage between said first position and said second position responsive to manipulation of said handle.

2. The flip top grill assembly of claim 1 wherein said assembly base has a generally elongated rectangular shape.

3. The flip top grill assembly of claim 2 wherein said assembly base comprises a pair of generally elongated, parallel longitudinal base members and a pair of generally elongated, parallel transverse base members connecting said longitudinal base members.

4. The flip top grill assembly of claim 1 wherein said grill cage comprises a base grill panel and a cover grill panel pivotally carried by said base grill panel.

5. The flip top grill assembly of claim 4 wherein said base grill panel comprises a generally elongated, rectangular base grill panel frame and a base grill panel mesh carried by said base grill panel frame and said cover grill panel comprises a generally elongated, rectangular cover grill panel frame carried by said base grill panel frame and a cover grill panel mesh carried by said cover grill panel frame.

6. The flip top grill assembly of claim 5 further comprising a grill cage latch provided on said grill cage.

7. The flip top grill assembly of claim 6 wherein said grill cage latch comprises a latch rod carried by a first one of said base grill panel and said cover grill panel and a latch receptacle carried by a second one of said base grill panel and said cover grill panel and having a latch receptacle opening adapted to receive said latch rod.

8. The flip top grill assembly of claim 1 further comprising a handle carried by said grill cage in addition to said at least one handle pivotally carried by said side cage support arm.

9. A flip top grill assembly, comprising:
    an assembly base;
    a pair of spaced-apart linkage assemblies carried by said assembly base and each comprising:
        a shaft support arm carried by said assembly base;
        a shaft support arm linkage pivotally carried by said shaft support arm at a fixed pivot point;
        a side cage support arm carried by said assembly base in spaced-apart relationship with respect to said shaft support arm; and
        a side cage support arm linkage pivotally carried by said side cage support arm;
    a grill cage pivotally carried by said shaft support arm linkage and said side cage support arm linkage of each of said pair of linkage assemblies;
    wherein said grill cage is positional between a first position and a second position inverted with respect to said first position by actuation of at least one of said pair of linkage assemblies; and
    at least one handle operably engaging said side cage support arm linkage of said at least one of said pair of linkage assemblies and adapted to facilitate pivoting of said grill cage between said first position and said second position responsive to movement of said handle.

10. The flip top grill assembly of claim 9 wherein said assembly base comprises a pair of generally elongated, parallel longitudinal base members and a pair of generally elongated, parallel transverse base members connecting said longitudinal base members.

11. The flip top grill assembly of claim 9 wherein said grill cage comprises a base grill panel and a cover grill panel pivotally carried by said base grill panel.

12. The flip top grill assembly of claim 11 wherein said base grill panel comprises a generally elongated, rectangular base grill panel frame and a base grill panel mesh carried by said base grill panel frame and said cover grill panel comprises a generally elongated, rectangular cover grill panel frame carried by said base grill panel frame and a cover grill panel mesh carried by said cover grill panel frame.

13. The flip top grill assembly of claim 12 further comprising a grill cage latch provided on said grill cage.

14. The flip top grill assembly of claim 13 wherein said grill cage latch comprises a latch rod carried by a first one of said base grill panel and said cover grill panel and a latch receptacle carried by a second one of said base grill panel and said cover grill panel and having a latch receptacle opening adapted to receive said latch rod.

15. The flip top grill assembly of claim 12 wherein said base grill panel frame of said base grill panel of said grill cage is pivotally carried by said shaft support arm linkage and said side cage support arm linkage of each of said pair of linkage assemblies.

16. The flip top grill assembly of claim 9 further comprising a handle carried by said grill cage in addition to said at least one handle operably engaging said side cage support arm linkage.

17. A flip top grill assembly, comprising:
    an assembly base;
    a pair of spaced-apart linkage assemblies carried by said assembly base and comprising:
        a pair of shaft support arms carried by said assembly base;
        a pair of shaft support arm linkages pivotally carried by said pair of shaft support arms, respectively, at fixed pivot points;
        a pair of side cage support arms carried by said assembly base in spaced-apart relationship with respect to said pair of shaft support arms, respectively, and in fixed and immovable relationship to said assembly base; and
        a pair of side cage support arm linkages pivotally carried by said pair of side cage support arms, respectively;
    a grill cage comprising:
        a base grill panel including a base grill panel frame having a front frame member, a rear frame member and a pair of side frame members connecting said front frame member and said rear frame member and pivotally carried by said pair of shaft support arm linkages and said pair of side cage support arm linkages of said pair of linkage assemblies, respectively, and a base grill panel mesh carried by said base grill panel frame;

wherein said pair of side cage support arm linkages of said pair of linkage assemblies, respectively, is pivotally attached to said pair of side frame members, respectively, of said base grill panel frame at generally a midpoint of said pair of side frame members, respectively, and said pair of shaft support arm linkages of said pair of linkage assemblies, respectively, is pivotally attached to said pair of side frame members, respectively, of said base grill panel frame between said midpoint of said pair of side frame members, respectively, and said front frame member; and a cover grill panel including a cover grill panel frame pivotally carried by said rear frame member of said base grill panel frame and a cover grill panel mesh carried by said cover grill panel frame; and wherein said grill cage is positional between a first position and a second position inverted with respect to said first position by actuation of at least one of said pair of linkage assemblies; and at least one handle operably engaging said side cage support arm linkage of said at least one of said pair of linkage assemblies and adapted to facilitate pivoting of said grill cage between said first position and said second position responsive to movement of said handle.

18. The flip top grill assembly of claim 17 wherein said assembly base comprises a pair of generally elongated, parallel longitudinal base members and a pair of generally elongated, parallel transverse base members connecting said longitudinal base members.

19. The flip top grill assembly of claim 17 further comprising a grill cage latch comprising a latch rod carried by a first one of said base grill panel and said cover grill panel and a latch receptacle carried by a second one of said base grill panel and said cover grill panel and having a latch receptacle opening adapted to receive said latch rod.

20. The flip top grill assembly of claim 17 further comprising at least one handle mount carried by at least one of said pair of side cage support arm linkages of said pair of linkage assemblies, respectively, and disposed at an obtuse angle with respect to said at least one of said pair of side cage support arm linkages and wherein said at east one handle is carried by said at least one handle mount.

\* \* \* \* \*